Sept. 26, 1944.  F. C. RUSHING ET AL  2,359,158
VIBRATION-MEASURING APPARATUS
Filed Feb. 12, 1942   2 Sheets-Sheet 1
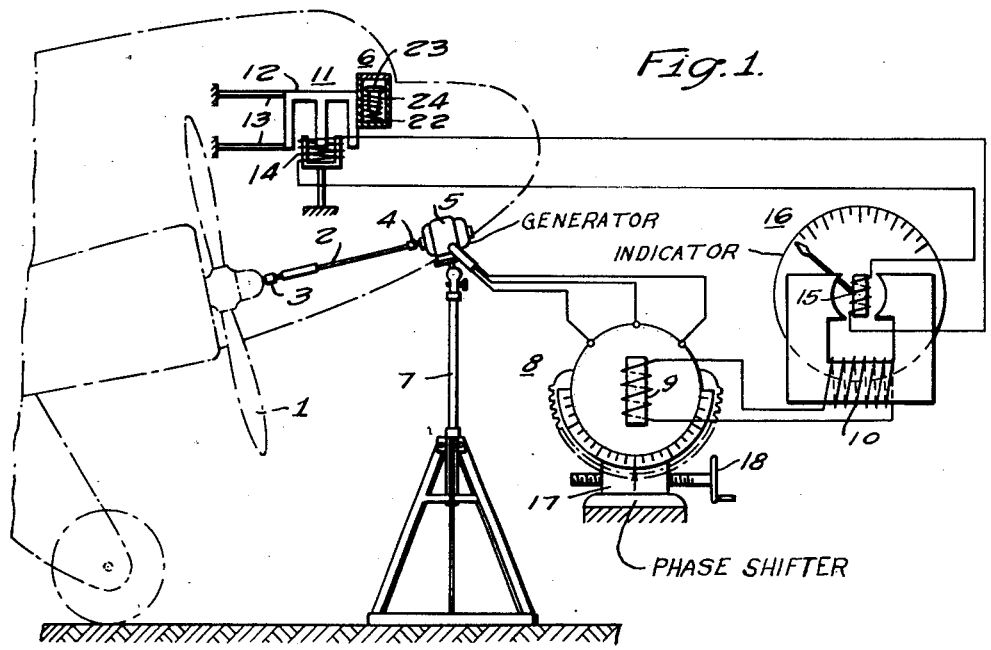
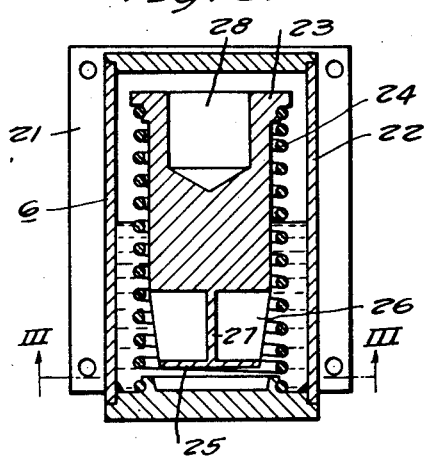
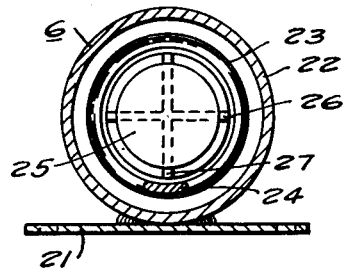
WITNESSES:
INVENTORS
Frank C. Rushing
and Milton P. Vore.
BY
ATTORNEY Sept. 26, 1944.   F. C. RUSHING ET AL   2,359,158
VIBRATION-MEASURING APPARATUS
Filed Feb. 12, 1942   2 Sheets-Sheet 2
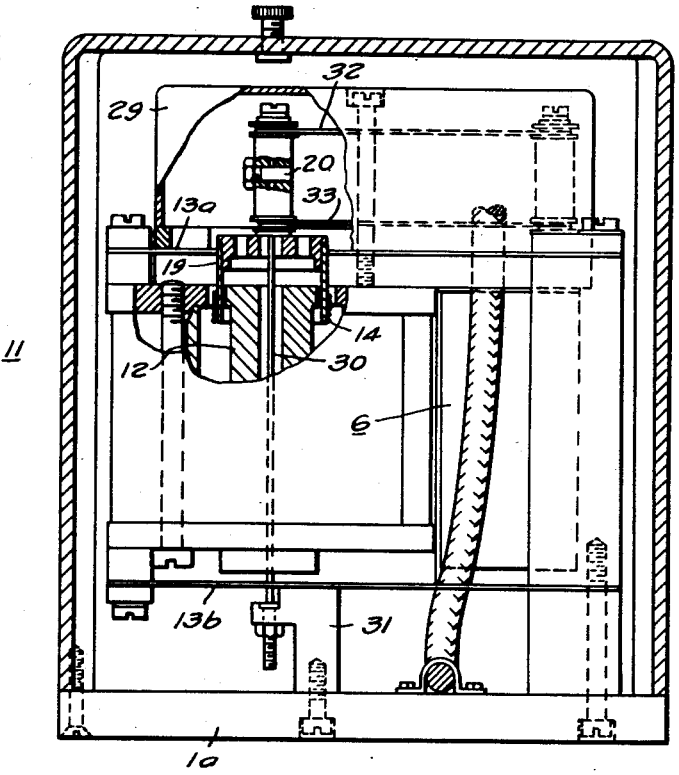
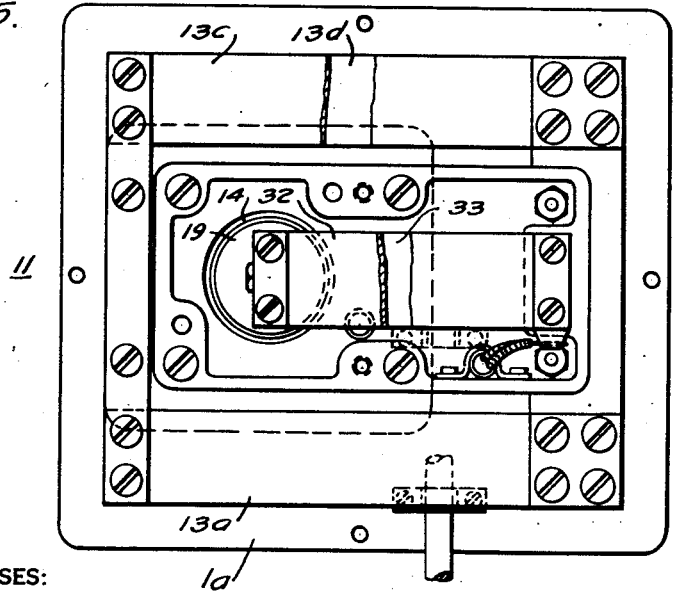
WITNESSES:
INVENTORS
Frank C. Rushing
and Milton P. Vore.
BY
ATTORNEY Patented Sept. 26, 1944

2,359,158

UNITED STATES PATENT OFFICE 2,359,158

VIBRATION-MEASURING APPARATUS

Frank C. Rushing, Pittsburgh, Pa., and Milton P. Vore, Catonsville, Md., assignors to Westinghouse Electric & Manufacturing Company, East Pittsburgh, Pa., a corporation of Pennsylvania Application February 12, 1942, Serial No. 430,570

8 Claims. (Cl. 177—351)

Our invention relates broadly to vibration-measuring apparatus, and is specifically directed to a damped electromagnetic pick-up unit for such apparatus, particularly useful when applied to the damping of body vibration of an airplane in the measurement of vibration of a propeller while mounted on an airplane. Our invention is also applicable to the measurement of vibrations in other similar devices wherein there is an inherent tendency for the supporting structure of the rotatable body to vibrate at a low frequency while the rotor, whose dynamic unbalance is to be measured, vibrates at a relatively high frequency.

A more specific object of our invention is to provide a hydraulic damper in an electromagnetic pick-up unit, which unit is to be mounted on the cockpit structure of an airplane which damper will damp out low frequency random motion of the plane while the higher frequency unbalance measurements are being made of the rotating propeller.

Other objects and advantages will become more apparent from a study of the following specification when considered in conjunction with the accompanying drawings, in which:

Figure 1 is a schematic showing of a wattmeter-type of circuit for measuring the unbalance of a propeller while mounted on an airplane;

Fig. 2 is a longitudinal cross-sectional view of a hydraulic damper unit shown enlarged which forms a part of the electromagnetic pick-up unit shown in Fig. 1;

Fig. 3 is a cross-sectional view taken along the line III—III of Fig. 2;

Fig. 4 is a longitudinal cross-sectional view, with certain portions broken away, of the complete electromagnetic pick-up unit, together with the special hydraulic damper shown in Fig. 1, but which is shown considerably enlarged; and Fig. 5 is a top view of the pick-up unit shown in Fig. 4, but with the cover removed.

It has been found possible to balance an airplane propeller while installed on an airplane. One process involves operating the propeller at normal speed and load with the plane blocked on the ground. Vibration measurements are made on the plane under these conditions, and the unbalance is determined from the measurements in a conventional manner.

Referring more particularly to Fig. 1 of the drawings, numeral 1 denotes a rotor—more specifically, a propeller which is mounted in place on an airplane, shown in dotted lines, or any other similar supporting structure. A long shaft 2, having universal joints 3 and 4 at each end, is provided for coupling the propeller to a three-phase, two-pole generator 5. The rotor of such generator is preferably in the form of a two-pole permanent magnet which is mechanically coupled to shaft 2. Such generator is preferably mounted on a stand 7 situated at a distance from the propeller. The stator of the generator has its terminals connected to the terminals of the stator of a phase-shifting transformer 8, which has a three-phase rotor, but which has a single-phase stator 9, the single-phase output of which is connected across the terminals of a stationary coil 10 of a dynamometer-type indicator (similar to a wattmeter) 16. It will be noted that the stator and rotor windings could be readily interchanged if desired.

An electrodynamic pick-up unit 11, schematically shown in Fig. 1, is provided having a core 12 which is yieldably or flexibly supported on the airplane by flat horizontal springs schematically denoted by numeral 13 for the purpose of confining the vibration to the plane of the drawings. Rigidly secured to the plane there is provided a coil 14 constituting the movable element of the pick-up unit, whereas coil 14 comprises the stationary element insofar as vibrations of the airplane structure are concerned. Core 12 is damped so as to absorb low frequency vibrations of the support by a spring-mounted weight 23 whose movements are restrained by a dashpot 6, having a viscous liquid therein. Coil 14 has its terminals connected to the terminals of the movable coil 15 of the indicating meter 16.

It will be apparent from the above that the alternating-current generator 5 driven at propeller speed delivers a three-phase current instead of a single-phase current, as required by the meter 16. By feeding this current to the phase-shifting transformer 8, whose primary is wound for three-phase similar to the alternator, and having a secondary which is single-phase, the primary may be rotated with respect to the secondary, and the secondary can be made to deliver current in any desired phase relationship to the propeller rotation merely by setting it in proper angular position. It is understood, of course, that the primary may be the stationary element and the secondary the rotatable one, if so desired. A stationary element 17, having an index line, cooperates with the calibrated rotatable three-phase primary, bearing the protractor, by a manual adjusting means shown schematically as a handwheel 18 having a worm wheel on the rotor. The outstanding advantage gained here with our phase-shifter arrangement is that an angle indicating unit is eliminated, and we get the same effect with the added advantage of having the phase shifter and meter both remotely situated from the propeller and close to one another, so that the phase setting of the phase shifter can be correlated to the reading of the meter.

As indicated above, the vibration pick-up 11 or detector is part of the measuring equipment. In its use it is desired that one part of the pick-up remain substantially fixed in position with respect to space in the direction in which the measurement is to be made, and it is desired that another part move with the vibrating body and that a signal proportional to the relative velocity be produced. A spring mounting is used to cause one part of the pick-up to remain stationary with respect to space at the running frequency vibration in the direction of measurement, but such a condition is not easy to obtain because of the low frequency random motion of the plane. This motion is detrimental because it causes the pick-up mass to vibrate at its natural frequency on its spring mounting. Often this vibration becomes great enough to cause the body to strike its stops.

This excessive free vibration of the spring-mounted pick-up causes undesirable erratic motion of the vibration meter needle and prohibits accurate vibration measurements. To improve this situation and in accordance with the teachings of our invention, a special damper has been applied to the vibration pick-up.

The application of this special damper is one of the outstanding features of our invention.

The damper consists first of a mounting plate 21 which has four holes for use in attaching it rigidly to the vibrating mass. By "vibrating mass" is meant the spring mounted mass whose low frequency swing is to be minimized. Onto this plate is attached a sealed hollow cylinder 22. Inside this cylinder is a body 23 supported on a coil spring 24. At the bottom of the mass are attached three vanes—vane 25 is perpendicular to the axis of the cylinder, and vanes 26 and 27 are, respectively, perpendicular to each other and to vane 25. The cylinder is filled about halfway with a viscous fluid.

If this damper assembly is attached to a body which vibrates in the direction of the axis of the cylinder, a vibration of the mass 23 on the spring 24 is excited. If the natural frequency of the mass 23 on the spring 24 is about equal to that of the pick-up mass on its own spring mounting, and if the ratio of the weights of the damper mass 23 to the pick-up mass 12 is at least .05 to .1, the damper will be very effective to stop the pick-up from vibrating freely. The exact analysis of this complete vibrating system is complicated, but, roughly, the action is for the damper mass to tend to move in the opposite direction to the main body and to force the oil through the effective orifice between vane 25 and the housing 22. In moving opposite to the motion of the main mass, the small mass tends to retard the motion of the main mass; and in stirring the oil, the vibration energy is converted into heat. Actually, under optimum conditions, the vibration amplitude of the damper mass will become much greater than that of the pick-up mass.

The vanes 26 and 27 are provided to damp the free vibration of the damper mass in a lateral direction so as to avoid excessive bumping between the damper mass and the housing.

The pocket 28 is for use in adding extra weight for tuning purposes during assembly and test.

When using the damper, a free vibration of the system would be damped out in three or four cycles, whereas without the damper the vibration would persist for perhaps a hundred or more cycles before reaching substantially a negligible value.

The damper described above in accordance with the teachings of our invention requires no moving seals—it can be soldered closed—and it does not affect the vibration reading at the frequency of engine rotation; it only affects the low frequency vibrations near the natural frequency of the pick-up, and this frequency is the most objectionable one. In use on an airplane, it appreciably contributes to producing a steady meter reading of propeller running frequency vibration amplitude.

Figs. 4 and 5 show the actual construction of the electromagnetic pick-up unit 11 shown schematically in Fig. 1. Reference numerals which refer to the same parts are identical in Figs. 1 to 5 inclusive. Rigidly secured to and forming a part of the permanent magnet 12 is a cover portion 29 which encloses an electrical pick-up coil 14. Pick-up coil 14 is mounted on a cylindrical support 19 which is secured, by a suitable fastening means 20, to a stiff wire 30 extending through the permanent magnet 12, and the lower end of which wire is rigidly secured to a supporting arm 31, which supporting arm is rigidly secured to the base member 1a. In other words, the coil 14 is rigidly secured to member 1a, while the permanent magnet 12 is relatively movable thereto by virtue of its suspension by leaf springs 13a, 13b, 13c and 13d. Leaf springs 32 and 33 provide a flexible connection between the coil supporting structure and the cover member 29 of the magnet so as to allow relative movement between the coil and magnet. By the above construction of the electromagnet, whenever, through accident or otherwise, there is any change laterally in the relative position of the permanent magnet 12 with respect to the supporting frame 1a, then the most that can happen is that the stiff wire 30 will bend slightly and compensate for this erroneous positioning, and the coil 14, together with its relative position with respect to magnet 12, will remain in substantially its initial position to form substantially the same air gap, and is in no way changed or disturbed. The dashpot 6 or damper unit is rigidly secured to the permanent magnet 12.

We are, of course, aware that others, particularly after having had the benefit of the teachings of our invention, may devise other devices embodying our invention, and we, therefore, do not wish to be limited to the specific showings made in the drawings and the descriptive disclosure hereinbefore made, but wish to be limited only by the scope of the appended claims.

We claim as our invention:

1. In combination with a vibration measuring device, an electromagnetic pick-up unit comprising a pair of relatively movable elements, namely, a magnet and a coil which are adapted to move relative to each other, damping means comprising an enclosure having a liquid therein and a freely suspended mass contained in said liquid, said enclosure being supported on one of said relatively movable elements for damping low frequency vibrations.

2. In a vibration measuring device, an electromagnetic pick-up unit comprising a support, a coil secured to said support and adapted to move therewith when said support is placed on a vibrating body, a magnet, a plurality of springs for supporting said magnet on said support for allowing relative movement between said coil and magnet in response to vibrations of said vibrating body, an enclosure containing a viscous liquid and rigidly secured to said magnet, a mass resiliently supported in said liquid and adapted to vibrate only certain vibrations as a result of vibrations of said vibrating body thereby damping movements of said magnet relative to said coil.

3. In a vibration measuring device, a support subjected to vibrations of a relatively high frequency, an electromagnetic pickup unit comprising a coil secured to said support for movement therewith, a magnet, and means resiliently mounting said magnet on said support, the mass of said magnet and said resilient means being so related that said magnet and resilient means will have a natural frequency of vibration less than said high frequency vibrations, and means for damping movement of said magnet due to transient forces other than said high frequency forces comprising a mass resiliently connected to said magnet and having a natural frequency of vibration about the same as the natural frequency of vibration of said magnet.

4. A device as claimed in claim 3 wherein said damping means comprises a sealed cylinder connected to said magnet and a spring for supporting said mass in said cylinder together with a fluid in said cylinder for damping relative movement between said mass and cylinder.

5. A device as claimed in claim 3 wherein said damping means comprises a sealed cylinder connected to said magnet and a spring for supporting said mass in said cylinder together with a fluid in said cylinder for damping relative movement between said mass and cylinder, said mass having a vertical vane at its lower end for damping lateral movement of said mass.

6. A device as claimed in claim 3 wherein said damping means comprises a sealed cylinder connected to said magnet and a spring for supporting said mass in said cylinder together with a fluid in said cylinder for damping relative movement between said mass and cylinder, said mass having a horizontal vane connected to and spaced from the lower portion of said mass to assist in said damping action.

7. A device as claimed in claim 3 wherein said damping means comprises a sealed cylinder connected to said magnet and a spring for supporting said mass in said cylinder together with a fluid in said cylinder for damping relative movement between said mass and cylinder, said mass having a horizontal vane connected to and spaced from the lower portion of said mass to assist in said damping action, said mass further having a vertical vane between said horizontal vane and mass for damping lateral movement of said mass in said cylinder.

8. As a subcombination in a vibratory system, a vibration damping device comprising a cylinder, a mass, a spring mounting said mass in said cylinder for vibrating movement relative thereto, said cylinder having liquid therein for damping the vibrating movement of said mass, said mass having a horizontal vane connected to and spaced from the bottom thereof for accentuating the damping action, and a vertical vane intermediate said horizontal vane and mass for damping lateral movement of said mass in said cylinder.

FRANK C. RUSHING.
MILTON P. VORE.